United States Patent Office 3,346,498
Patented Oct. 10, 1967

3,346,498
LUBRICATING OIL COMPOSITION CONTAINING HIGH MOLECULAR WEIGHT OLEFIN-DIOLEFIN COPOLYMER
Louis de Vries, Richmond, Calif., assignor to Chevron Research Company, a corporation of Delaware
No Drawing. Continuation of application Ser. No. 375,967, June 17, 1964, which is a division of application Ser. No. 248,212, Dec. 31, 1962. This application June 6, 1966, Ser. No. 555,618
2 Claims. (Cl. 252—59)

ABSTRACT OF THE DISCLOSURE

Stereoregular copolymers derived from cracked wax olefin and diolefin mixtures containing from about 11 to about 15 carbon atoms in waxy mineral lubricating oil compositions to lower the pour point.

---

This application is a continuation of De Vries U.S. application No. 375,967, filed June 17, 1964, which in turn is a division of De Vries U.S. application No. 248,212, filed Dec. 31, 1962, on "Hydrocarbon Polymer," both of which are now abandoned.

This invention relates to a novel hydrocarbon polymer. More particularly, the invention is concerned with a new stereoregular high molecular weight unsaturated hydrocarbon polymer and lubricant compositions containing it.

High molecular weight hydrocarbon polymers are useful in a variety of applications. They are widely used as thickeners in surface coating compositions, such as paints and the like. They are also widely used as thickeners for fuel compositions or as viscosity index improvers in lubricating oil compositions.

High molecular weight hydrocarbon polymers are further useful as chemical intermediates for the preparation of valuable oil-soluble compounds. For example, the polymers may be substituted with polar groups to provide superior new dispersants for paints, fuels, lubricants and other compositions.

It has now been found that an improved new high molecular weight unsaturated polymer is provided in the copolymer of a cracked wax olefin mixture of (A) α-olefins of from about 6 to about 20 carbon atoms and (B) diolefins of from about 6 to about 20 carbon atoms in which the mole ratio of (A) to (B) is from about 1:1 to about 400:1, said unsaturated copolymer having a molecular weight as determined by standard light scattering methods of from about 50,000 to about 1,000,000, said copolymer having been prepared in the presence of a co-catalyst system comprising a reducing metal compound and a reducible metal compound.

The high molecular weight hydrocarbon polymer of this invention possesses valuable thickening characteristics in liquid hydrocarbon compositions, such as fuels and lubricants. Due to its unsaturated nature, the hydrocarbon polymer is particularly suitable as a chemical intermediate. The appropriate addition of polar groups through the double bond provides a variety of superior new dispersants for paints, fuels, lubricants and other compositions. Also, the polymer itself is an excellent pour point depressant for waxy type mineral lubricating oils and hydrocarbon fuels.

The high molecular weight unsaturated hydrocarbon polymer may also be conveniently characterized as having the general formula

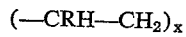

in which $x$ is an integer and in which polymer R represents mixed straight chain alkyl and straight chain alkenyl radicals, said radicals containing from about 4 to about 18 carbon atoms each, the ratio of alkyl radicals to alkenyl radicals being from about 1:1 to about 400:1, said polymer having a molecular weight as determined by standard light scattering methods of from about 50,000 to about 1,000,000 and a solubility in mineral lubricating oil of at least about 0.1% by weight.

The unsaturated polymer of the invention may also be described as having a mixture of recurring monomer units of the general formula

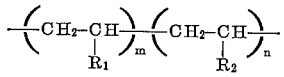

in which polymer $R_1$ is an alkyl radical selected from the group consisting of straight chain alkyl radicals of 4 to 18 carbon atoms and mixtures thereof and $R_2$ is an alkenyl radical selected from the group consisting of straight chain alkenyl radicals of from 4 to 18 carbon atoms and mixtures thereof, said monomer units being derived from cracked wax olefins and diolefin mixtures, the ratio of $m$ to $n$ being from about 10:1 to about 100:1.

The cracked wax olefin mixtures which are employed in the preparation of the copolymer of this invention are mixtures of α-olefins containing at least 2 carbon atoms. Such olefins include ethylene, propylene, α-butene, α-pentane, α-hexene, α-heptene, α-tetradecene, α-octadecene, etc. The cracked wax olefin mixtures also contain polyolefins having at least one terminal double bond and at least 6 carbon atoms. These polyolefins include 1,5-hexadiene, 1,11-dodecadiene, 1,17-octadecadiene, 1,4-octadiene, 1,8-octadecadiene, 1,9,12-octadecatriene, etc.

In the preferred cracked wax olefin mixtures used in the copolymers of the invention, the olefins contain from 6 to 20 carbon atoms. Such olefin mixtures are suitably prepared by cracking of conventional refined paraffin wax derived from typical waxy crude oils. These waxes ordinarily consist of about 90% normal paraffins containing from about 21 to about 35 carbon atoms. The balance of the wax composition is made up of isoparaffins, naphthenes and small proportions of aromatic hydrocarbons.

Thermal cracking of the paraffin wax is preferred since it produces higher proportions of α-olefins. Vapor phase thermal cracking in particular is preferred for maximum α-olefin production. The thermal cracking is conveniently carried out by passing a paraffin wax charge stock through a reaction zone, such as a hot tube, usually at temperatures of about 500° C. to about 600° C. A few seconds per pass is ordinarily sufficient to produce the cracked wax olefin mixtures. Conversions of about 30 to 35% per pass are ordinarily obtained. The thermal cracking may be carried out at atmospheric conditions, but pressure or vacuum may be desirable in some instances. In the cracking procedure, it may also be desirable to use diluents, such as steam.

The products from the cracking reaction include hydrogen, methane and hydrocarbons containing as high as 35 carbon atoms. They are effectively separated by conventional means, such as fractional distillation. The lower boiling portion of the products including hydrocarbons of five or fewer carbon atoms may be used as a fuel or in gasoline blending. The portion containing hydrocarbons of more than 20 carbon atoms, if desired, may be recycled for further cracking. The $C_6$ to $C_{20}$ portion may be further fractioned into particular hydrocarbons having carbon contents of $C_{6-7}$, $C_{7-9}$, $C_{9-11}$, $C_{11-15}$, $C_{15-20}$ and the like.

Other paraffin wax charge stocks, cracking conditions and separation procedures of the above-mentioned types are found in descriptions in various publications. The description in U.S. Patent No. 2,172,228 on "Process For The Manufacture Of Olefins" is illustrative.

The analysis of a typical cracked wax olefin mixture indicates the following distribution of products:

| | Percent |
|---|---|
| Straight chain α-olefins | 89 |
| Straight chain α,ω-diolefins | 5 |
| Straight chain α-internal polyolefins | 1 |
| Branched chain and naphthenic hydrocarbons | 3 |
| Conjugated internal diolefins, etc. | 2 |

Depending on particular cracking procedures and refining and blending of cracked products, the ratio of α-monoolefins to polyolefins having a terminal double bond may range from as low as about 1:1 to as high as about 400:1. Preferred cracked wax olefins are those having ratios from about 10:1 to about 100:1.

The copolymers of this invention are prepared by reacting the cracked wax olefin mixtures in the presence of a stereospecific catalyst capable of providing stereoregulated polymerization. Suitable catalysts and other general background for this type of polymerization reaction have been currently described in a report entitled "Stereospecific Catalysts:" beginning at page 93 in the journal "Chemical Engineering" for April 2, 1962 (McGraw-Hill Publishing Co., New York, N.Y.).

The stereospecific catalytic polymerization reaction employed in the preparation of the polymers is an addition type polymerization. The exact mechanisms is still not known, but it is generally thought that stereospecific catalysts provide controlled propagation of the polymer chain from the monomers. This controlled propagation in the case of the present α-olefin monomer mixture results in a linear hydrocarbon chain having mixed alkyl and alkenyl substituents on alternate carbon atoms as already discussed. For present purposes, the catalyst ordinarily involves the combination of a reducing metal compound with a reducible metal compound.

Suitable reducing compounds are illustrated by the organo-aluminum compounds of the formula

$$R'R''AlX$$

in which R' and R'' are hydrogen or hydrocarbon and X is hydrogen, hydrocarbon, halogen, alkoxy, aryloxy, amino, amido, mercapto, etc. Other metals than aluminum, such as zinc, magnesium, beryllium, indium, or gallium, may be used. Examples of these compounds are diisobutyl aluminum hydride, diethyl aluminum chloride and magnesium methylate. Preferably the reducing compound is an aluminum compound having 3 hydrocarbon radicals of from 1 to 10 carbon atoms each, which may be the same or different. Illustrative compounds are trimethyl aluminum, triisobutyl aluminum, triphenyl aluminum, tribenzyl aluminum, diethylmethyl aluminum, phenyldiethyl aluminum and tricyclopentyl aluminum. The most preferred aluminum compounds are the trialkyl aluminums having 2 to 6 carbon atoms in each alkyl group.

Satisfactory reducible metal compounds are those including a metal of groups IV to VIII of the periodic system of elements. Such elements include titanium, zirconium, vanadium, chromium, molybdenum, etc. Suitable compounds of such metals are the halides, the oxyhalides, the alcoholates and the carboxylic acid salts; for example, titanium tetrachloride, vanadium oxychloride, chromium acetate, etc. Preferred are the halide compounds. More particularly preferred for present purposes are titanium tetrachloride and the complex chemical reaction product containing 3 moles of titanium trichloride to 1 mole of aluminum chloride (sold by Stauffer Chemical Company, Anderson Chemical Division as "TiCl₃ AA, Aluminum-Reduced Activated").

The copolymerization is conveniently carried out in an inert hydrocarbon diluent. Sufficient diluent is employed to maintain a relatively fluid reaction mixture for ease of handling. Reaction temperatures in the range of about 30° C. to about 150° C. are ordinarily suitable. The reaction may be carried out at reduced pressures, atmospheric pressure or at elevated pressures. Suitable pressures may range as high as 2,000 lbs. per sq. inch or higher. For present purposes, atmospheric pressure is preferred. The reaction time is usually sufficiently long to give desired conversion to polymers of the appropriate molecular weight. Ordinarily, the reaction times may range from about 0.1 to 100 hours. However, for present purposes shorter periods of from about 0.5 to 10 hours are most satisfactory from the standpoint of conversions and molecular weight of polymeric products.

When the polymerization reaction is completed to the desired extent, the reaction is stopped by quenching the reaction mixture. This is done by addition of an alcohol, such as isopropyl alcohol, or a ketone, such as acetone or other aliphatic oxygen compound. The addition of the quenching material deactivates the polymerization catalyst. It may also serve in most cases to precipitate the copolymer product from the inert hydrocarbon liquid diluent.

As previously mentioned, the copolymers of the invention are linear hydrocarbon chains having mixed alkyl and alkenyl substituents on alternate carbon atoms. They have molecular weights of from about 50,000 to about 1,000,000. Such molecular weights are ordinarily determined by viscosity measurements and/or standard light scattering methods.

The following examples are further illustrative of the preparation of stereoregular cracked wax olefin copolymers in accordance with this invention.

Example 1

A co-catalyst mixture is prepared as the first step. Seventy-five cubic centimeters of dry heptane is put into a 2-liter round bottom fitted with condenser and stirrer. From a polyethylene bag, against a nitrogen stream, there is then added a vial containing 7.5 g. of titanium trichloride catalyst (Anderson Chemicals AA-Grade which contains some aluminum chloride). Through a pressure-equalized addition funnel there is now added another 75 cc. of heptane containing 9.35 g. of triisobutyl aluminum. During these operations, the temperature is 0° C.

As the next step, 600 cc. of dry xylene is added to the catalyst mixture at reflux temperature against a nitrogen stream. External heat is applied during this operation and when the temperature of the catalyst suspension reaches reflux, 200 g. of cracked wax olefins containing from 10 to 20 carbon atoms is aded at about 110° C., again against effluent nitrogen. At this point the heating mantle is temporarily removed until the temperature increase due to the polymerization reaction subsides. After 45 minutes at maintained reflux, the mantle is lowered and when the temperature reaches 100° C., isopropyl alcohol is added until no further violent reaction occurs. Subsequent addition of a large amount of methanol now precipitates the polymer. The supernatant is discarded, and the polymer is washed with methanol and then with acetone. After three subsequent precipitations from benzene solution with acetone, the polymer is dissolved in benzene. Evaporation of an aliquot proves the yield to be 89%.

Example 2

In this example, the first step consists of charging 200 g. of cracked wax olefin and 100 g. of xylene to a 2-liter, 3-neck reaction flask equipped with addition funnel and mechanical stirrer. The cracked wax olefin mixture consists of unsaturated aliphatic hydrocarbons of the previously described type containing from about 11 to about 15 carbon atoms. The charge is heated to about 135° C. and blown with nitrogen to remove dissolved oxygen.

In the second step, 2.8 g. of the titanium trichloride-aluminum chloride complex Stauffer ARA catalyst in 100 ml. of xylene and 3.9 ml. of triisobutyl aluminum in 50 ml. of xylene are combined to form a co-catalyst which is then fed to the reaction flask. The temperature of the reaction mixture, as mentioned above, is about 135° C., and the addition of catalyst is controlled to maintain this approximate temperature.

After about 3 hours reaction time, 40 ml. of ethanolamine is added and the mixture is stirred for about 30 minutes longer. The polymeric product produced by the reaction is precipitated by addition of methanol to the mixture, and the polymer is then dissolved in benzene. The residual methanol is removed by azeotropic distillation. The conversion is about 93.6% based on cracked wax olefin charge.

*Example 3*

In this example, the equipment and general procedure are the same as in Example 2. 200 g. of cracked wax olefin mixture and 5 g. of phenyl-β-naphthylamine are charged to the reaction flask. The cracked wax olefin mixture consists approximately of 30% $C_{9-11}$, 40% $C_{11-15}$ and 30% $C_{15-20}$ olefins. The charge is heated to about 100° C. and the equipment and charge are purged with nitrogen to remove oxygen.

The co-catalyst mixture consists of 4.5 g. of the titanium trichloride-aluminum chloride complex Stauffer ARA catalyst in 50 ml. of xylene and 2.9 ml. of ethyl aluminum dichloride in 50 ml. of xylene which are added to the reaction flask. The rate of addition of catalyst is controlled to maintain the reaction temperature at about 100° C. to 110° C. There is a vigorous evolution of heat, and the reaction flask is cooled with a water bath.

After about 3 hours, the evolution of heat ceases and the reaction is shut down. 40 ml. of ethanolamine is added and the reaction mixture stirred for about 30 minutes. The polymer product is precipitated with methanol, dissolved in benzene and azeotroped free of methanol. The yield is 740 g., which indicates a conversion of about 88% based on cracked wax olefin charge.

The copolymers of this invention are oil soluble. This is intended to mean that they are soluble in conventional mineral oils and other oil compositions in a concentration of copolymer of at least about 0.1% by weight based on the total composition.

In the lubricating oil compositions of this invention, the copolymer is used with lubricating oil base in amounts sufficient to raise the viscosity index and/or lower the pour point of the base lubricating oil. Ordinarily, amounts of copolymer of from about 0.1% to about 15% by weight are satisfactory for these purposes. In view of the excellent solubility characteristics of the copolymers, a further feature of the invention lies in the preparation of lubricating oil concentrates containing higher percentages of copolymers up to about 75%.

The base oil in the lubricant composition of the invention is any oil of lubricating viscosity. Thus, the base oil can be a refined paraffin-type base oil, a refined naphthenic-type base oil, or a synthetic hydrocarbon or synthetic nonhydrocarbon oil of lubricating viscosity. As synthetic oils, suitable examples include oils obtained by polymerization of lower molecular weight alkylene oxides, such as propylene oxide and/or ethylene oxide employing alcohol or acid initiators, such as lauryl alcohol or acetic acid. Still other synthetic oils include esters, e.g., di-(2-ethyl-hexyl)-sebacate, tricresylphosphate and silicate esters, such as tetra-(2-ethylhexyl)-orthosilicate and hexa-(2-ethylbutoxy)-disiloxane. For present purposes the mineral lubricating oils are preferred, since they show the greatest viscosity and stability improvement.

Lubricant compositions within the scope of the present invention may also contain still other additives of conventional types, such as pour point depressants, oiliness and extreme pressure agents, anti-oxidants, blooming agents and the like. Other types of detergents, such as metal salts, may also be employed where ash formation is not a problem.

Illustrative lubricant compositions of the aforementioned types containing additives other than the polymeric additive may include, for example, from about 0.1 to about 10% by weight of alkaline earth metal, higher alkyl phenate detergent and wear reducing agents such as the calcium alkylphenate having mixed alkyl groups of 12 to 15 carbon atoms. They may also include from about 0.1 to 10% by weight of organic thiophosphate corrosion and high-temperature oxidation inhibitors, such as the reaction product of pinene and $P_2S_5$, the reaction product of polybutene and $P_2S_5$, and the bivalent metal dihydrocarbon dithiophosphates, zinc butyl amyl dithiophosphate and zinc di-(tetradecylphenyl) dithiophosphate. Metal salt detergents in amounts from about 0.1 to 10% which may also be used are the calcium petroleum sulfonates of the oil soluble mahogany type and the calcium naphthenates.

The outstanding characteristics of the lubricating oil composition containing the copolymers in accordance with this invention are shown in various tests. In these tests the viscosities of the compositions are determined and the viscosity index calculated by the Standard ASTM Method D567–41.

In the tests, 2.8% by weight of the copolymer of Example 2 is dissolved in 150 Neutral Oil, which is a California paraffin base oil having a viscosity of 150 SSU at 100° F. This base oil ordinarily has a viscosity index of 85. The viscosity index of the oil containing the copolymer was raised to 137.

The pour point depressant characteristics of the copolymer are illustrated by other tests. In these tests, the 2.8% of the copolymer is added to 150 neutral oil which ordinarily has an ASTM pour point of 15° F. and a stable pour point of 20° F. In both the stable pour point test and the ASTM pour point test, ASTM method D97–47 for determining pour points is followed. The addition of 2.8% of the copolymer to the base oil results in an ASTM pour point of —15° F. and a stable pour point of —35° F.

What is claimed is:

1. A lubricating oil composition comprising a major proportion of waxy mineral lubricating oil and a minor proportion sufficient to lower the pour point of the oil of an unsaturated hydrocarbon polymer having a mixture of recurring units of the general formula

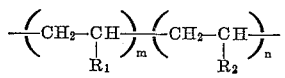

in which polymer $R_1$ is an alkyl radical and $R_2$ is an alkenyl radical, said units being formed by polymerizing a cracked wax or cracked wax fraction both being composed essentially of a mixture of $C_{11}$ to $C_{15}$ alpha olefins and diolefins in substantially the same ratio in which they are present in the cracked wax, in the presence of a stereospecific co-catalyst combination of a reducing metal compound with a reducible metal compound, the ratio of $m$ to $n$ being from about 10:1 to about 100:1, said unsaturated polymer having a molecular weight as determined by standard light scattering methods of from about 50,000 to about 1,000,000 and a solubility in mineral lubricating oil of at least about 0.1% by weight.

2. A lubricating oil composition in accordance with claim 1 wherein the unsaturated hydrocarbon polymer is present in amounts of from about 0.1% to about 15% by weight.

References Cited

UNITED STATES PATENTS

| | | | |
|---|---|---|---|
| 2,945,076 | 7/1960 | Pardee | 260—683 |
| 3,103,485 | 9/1963 | Cahn | 208—130 |
| 3,166,542 | 1/1965 | Orzechowski et al. | 252—59 |
| 3,221,077 | 11/1965 | Dulaney et al. | 260—683 |
| 3,223,638 | 12/1965 | Anderson et al. | 252—59 |

OTHER REFERENCES

"Petroleum Refining with Chemicals," Kalichevsky et al. (1956) pp. 534 and 535, Pub. by Elsevier Pub. Co.

DANIEL E. WYMAN, *Primary Examiner.*

W. H. CANNON, *Assistant Examiner.*